US012040693B2

(12) United States Patent
Yang

(10) Patent No.: US 12,040,693 B2
(45) Date of Patent: Jul. 16, 2024

(54) CONTROL CIRCUIT WITH AUTOMATIC FREQUENCY MODULATION FOR DC-DC CONVERTER

(71) Applicant: ELITE SEMICONDUCTOR MICROELECTRONICS TECHNOLOGY INC., Hsinchu (TW)

(72) Inventor: Yao-Wei Yang, Hsinchu (TW)

(73) Assignee: ELITE SEMICONDUCTOR MICROELECTRONICS TECHNOLOGY INC., Hsinchu (TW)

( * ) Notice: Subject to any disclaimer, the term of this patent is extended or adjusted under 35 U.S.C. 154(b) by 226 days.

(21) Appl. No.: 17/872,024

(22) Filed: Jul. 25, 2022

(65) Prior Publication Data

US 2024/0030799 A1 Jan. 25, 2024

(51) Int. Cl.
*H02M 1/00* (2007.01)
*H02M 3/156* (2006.01)

(52) U.S. Cl.
CPC ......... *H02M 1/0009* (2021.05); *H02M 3/156* (2013.01)

(58) Field of Classification Search
CPC ............................ H02M 1/0009; H02M 3/156
See application file for complete search history.

(56) References Cited

U.S. PATENT DOCUMENTS

| 6,853,174 | B1 * | 2/2005 | Inn ..................... H02M 3/1588 323/284 |
| 8,519,691 | B2 * | 8/2013 | McCloy-Stevens ..................... H02M 3/1588 323/287 |
| 10,680,522 | B2 | 6/2020 | Fukumoto |
| 10,756,627 | B2 | 8/2020 | Hsu et al. |
| 2011/0018507 | A1 * | 1/2011 | McCloy-Stevens ..................... H02M 3/1588 323/271 |
| 2016/0164412 | A1 * | 6/2016 | Li ............................ G01R 31/40 323/299 |
| 2022/0360177 | A1 * | 11/2022 | Castellano ............ H02M 3/157 |

FOREIGN PATENT DOCUMENTS

| GB | 2472115 A | * | 1/2011 | .......... H02M 3/1588 |
| WO | WO-2011010141 A2 | * | 1/2011 | .............. G05F 1/575 |

* cited by examiner

*Primary Examiner* — Sisay G Tiku

(57) ABSTRACT

A control circuit for controlling a DC-DC converter is provided. The control circuit comprises a first sensor, second sensor, error amplifier, signal conditioning circuit, first comparison circuit, second comparison circuit, and driver circuit. The error amplifier is configured to receive a feedback voltage and a reference voltage for generating a first voltage. The signal conditioning circuit is configured to receive the first voltage for generating a second voltage and a third voltage. The first comparison circuit is configured to make a comparison based on a first sensing signal from the first sensor and the second voltage for generating a first comparison signal. The second comparison circuit is configured to make a comparison based on a second sensing signal from the second sensor and the third voltage for generating a second comparison signal. The driver circuit is for driving a power stage according to the first and second comparison signals.

13 Claims, 11 Drawing Sheets

CONTROL CIRCUIT WITH AUTOMATIC FREQUENCY MODULATION FOR DC-DC CONVERTER

BACKGROUND OF THE INVENTION

1. Field of the Invention

The present disclosure relates to a control circuit for controlling a DC-DC converter, and in particular to a control circuit for controlling a DC-DC converter by sensing high-side current and low-side current and generating a first sensing signal and a second sensing signal and comparing voltages of the sensed signals to drive a power stage according to the comparison results.

2. Description of the Related Art

Direct current to direct current (DC-DC) converters are useful electronic circuits. DC-DC converters are effectively utilized in popular devices such as mobile phones and laptop computers.

However, conventional DC-DC converters can be inefficient or not as efficient as desirable and as a result can waste power thereby draining the device's battery prematurely.

Therefore, to overcome the disadvantages of the prior art, there is need for an improved method of controlling a DC-DC converter to effectively improve efficiency with light load and mid-light load conditions.

BRIEF SUMMARY OF THE INVENTION

An objective of the present disclosure is to provide a control circuit and method for controlling a DC-DC converter by sensing high-side current and low-side current and generating a first sensing signal and a second sensing signal and comparing voltages to drive a power stage according to the comparison results.

The present disclosure provides embodiments of a control circuit for controlling a DC-DC converter, wherein the DC-DC converter includes a high-side switch and a low-side switch connected to the high-side switch. The control circuit comprises a first sensor, a second sensor, an error amplifier, a signal conditioning circuit, a first comparison circuit, a second comparison circuit, and a driver circuit. The first sensor is configured to receive a first side current associated with the high-side switch for generating a first sensing signal. The second sensor is configured to receive a second side current associated with the low-side switch for generating a second sensing signal. The error amplifier is configured to receive a feedback voltage and a reference voltage for generating a first voltage. The signal conditioning circuit is configured to receive the first voltage for generating a second voltage and a third voltage. The signal conditioning circuit is configured to generate a compensated voltage signal according to the first voltage. The signal conditioning circuit is configured to generate the second voltage and the third voltage according to the compensated voltage signal if the compensated voltage signal is greater than or equal to a voltage signal threshold while the high-side switch is on, and the signal conditioning circuit is configured to generate the second voltage based on the voltage signal threshold and to generate the third voltage according to the compensated voltage signal if the compensated voltage signal is less than the voltage signal threshold while the high-side switch is on. The first comparison circuit is configured to make a comparison based on the first sensing signal and the second voltage for generating a first comparison signal. The second comparison circuit is configured to make a comparison based on the second sensing signal and the third voltage for generating a second comparison signal. The driver circuit is for driving the power stage according to the first comparison signal and the second comparison signal.

In some embodiments of the control circuit, the signal conditioning circuit is configured to generate the third voltage according to the compensated voltage signal and store energy according to the third voltage while the high-side switch is on.

In some embodiments of the control circuit, the signal conditioning circuit is configured, after the high-side switch turns off and the low-side switch is on, to output the third voltage to the second comparison circuit according to the energy stored during the high-side switch being on.

In some embodiments of the control circuit, the signal conditioning circuit comprises a slope compensation circuit, a first summer circuit, a selector, and a second summer circuit. The slope compensation circuit is for generating a slope compensation voltage signal. The first summer circuit is for receiving the first voltage and the slope compensation voltage signal to output the compensated voltage signal. The selector is for outputting a compensation voltage selectively according to whether the first compensated voltage signal is less than the voltage signal threshold. The second summer circuit is coupled to an output of the first summer circuit and an output of the selector to generate the second voltage. The second summer circuit generates the second voltage according to the compensated voltage signal if the compensated voltage signal is greater than or equal to the voltage signal threshold while the high-side switch is on, and the second summer circuit generates the second voltage based on the voltage signal threshold if the compensated voltage signal is less than the voltage signal threshold while the high-side switch is on.

In some embodiments of the control circuit, the signal conditioning circuit further comprises an energy buffer configured to generate the third voltage according to the compensated voltage signal and store energy according to the third voltage while the high-side switch is on.

In some embodiments of the control circuit, the energy buffer is configured, after the high-side switch turns off and the low-side switch is on, to output the third voltage to the second comparison circuit according to the energy stored during the high-side switch being on.

In some embodiments of the control circuit, the signal conditioning circuit comprises a first slope compensation circuit, a selector, and a first output terminal. The first slope compensation circuit is for generating a first compensated voltage signal according to the first voltage as the compensated voltage signal. The selector is for selectively outputting a voltage based on the voltage signal threshold according to whether the first compensated voltage signal is less than the voltage signal threshold. The first output terminal is coupled to an output of the first slope compensation circuit and an output of the selector to output the second voltage. The signal conditioning circuit outputs the second voltage according to the first compensated voltage signal through the first output terminal if the first compensated voltage signal is greater than or equal to the voltage signal threshold while the high-side switch is on, and the signal conditioning circuit outputs the voltage based on the voltage signal threshold as the second voltage through the first output terminal if the first compensated voltage signal is less than the voltage signal threshold while the high-side switch is on.

In some embodiments of the control circuit, the signal conditioning circuit further comprises a second slope compensation circuit, an output switch, an energy buffer coupled to the output switch, and a second output terminal. The second slope compensation circuit is for generating a second compensated voltage signal according to the first voltage. The output switch is coupled between the second output terminal and the second slope compensation circuit and the energy buffer is coupled to the second output terminal. While the high-side switch is on, the output switch turns on so that the signal conditioning circuit outputs the second compensated voltage signal as the third voltage through the second output terminal and the energy buffer stores energy according to the third voltage.

In some embodiments of the control circuit, after the high-side switch turns off and the low-side switch is on, the output switch turns off so that the energy buffer output the third voltage to the second comparison circuit according to the energy stored during the high-side switch being on.

In some embodiments of the control circuit, the control circuit further comprises a summer circuit, coupled between the second sensor and the second comparison circuit, for outputting a summation signal based on the second sensing signal and a threshold voltage signal, wherein the second comparison circuit has a first input terminal to receive the summation signal and a second input terminal to receive the third voltage so as to make the comparison based on the second sensing signal and the third voltage for generating the second comparison signal.

In some embodiments of the control circuit, the first sensor comprises a high-side current sensor.

In some embodiments of the control circuit, the second sensor comprises a low-side current sensor.

In some embodiments of the control circuit, the driver circuit further comprises a control logic circuit for turning on and off the high-side switch and the low-side switch according to the first comparison signal and the second comparison signal.

DETAILED DESCRIPTION OF THE INVENTION

To facilitate understanding of the object, characteristics and effects of this present disclosure, embodiments together with the attached drawings for the detailed description of the present disclosure are provided.

Figure 1A:
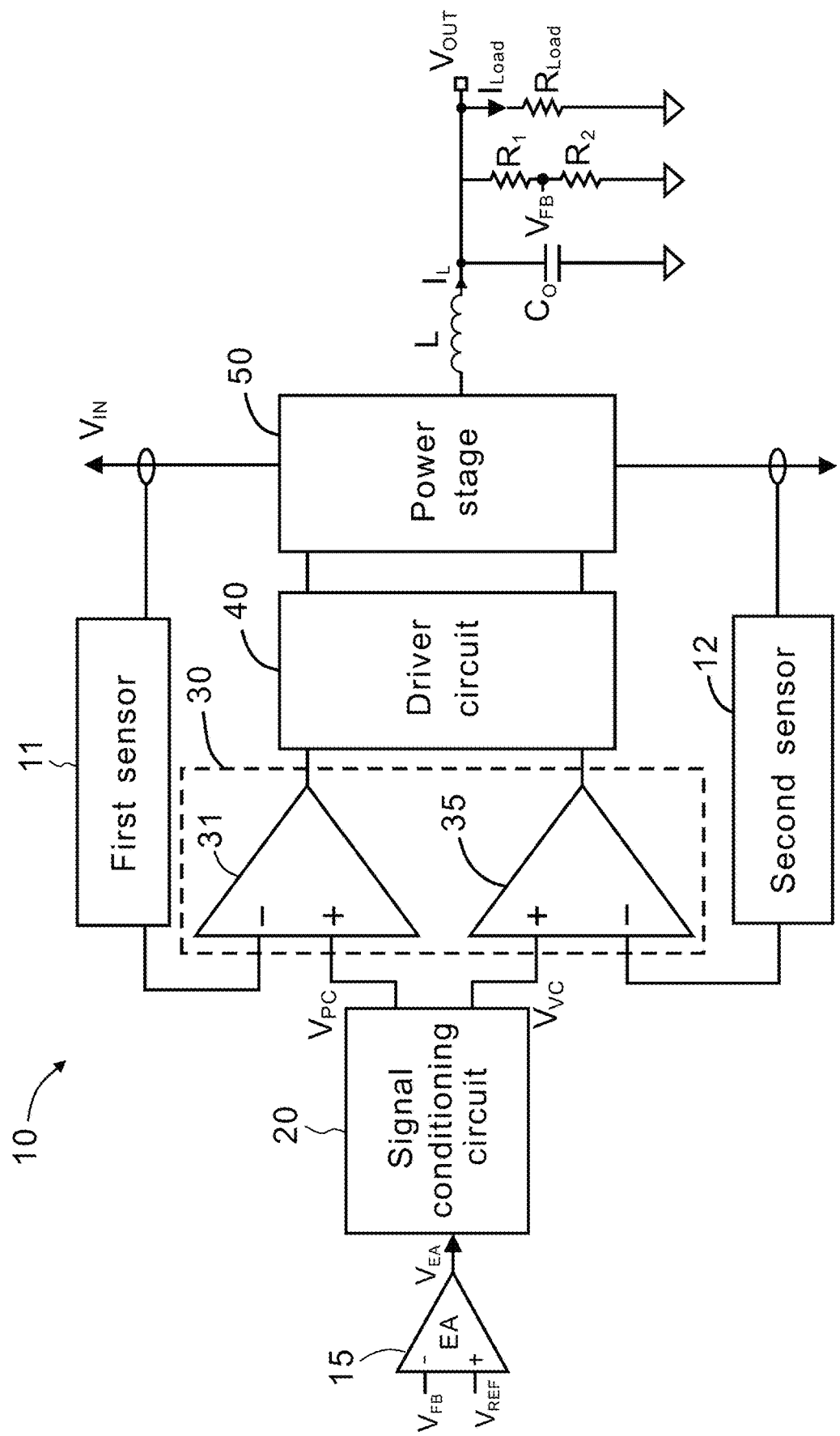
FIG. 1A is a drawing illustrating architecture of a control circuit with automatic frequency modulation for a DC-DC converter according to various embodiments of the present invention.

Refer to FIG. 1A, which is a drawing illustrating architecture of a control circuit with automatic frequency modulation for a DC-DC converter according to various embodiments of the present invention. In general, the DC-DC converter comprises a power stage 50, which includes a high-side switch $SW_{HS}$ and a low-side switch $SW_{LS}$ connected to the high-side switch $SW_{HS}$, as exemplified in FIG. 1B. As shown in FIG. 1A, a control circuit 10 for controlling the DC-DC converter comprises a first sensor 11, a second sensor 12, an error amplifier 15, a signal conditioning circuit 20, a first comparison circuit 31, a second comparison circuit 35, and a driver circuit 40. The first sensor 11 is configured to receive a first side current associated with the high-side switch $SW_{HS}$ for generating a first sensing signal. The second sensor 12 is configured to receive a second side current associated with the low-side switch $SW_{LS}$ for generating a second sensing signal. The error amplifier 15 is configured to receive a feedback voltage (e.g., denoted by $V_{FB}$) and a reference voltage (e.g., denoted by $V_{REF}$) for generating a first voltage (e.g., an error amplifier output voltage denoted by $V_{EA}$). The signal conditioning circuit 20 is configured to receive the first voltage for generating a second voltage (e.g., a peak compensation voltage denoted by $V_{PC}$) and a third voltage (e.g., a valley compensation voltage denoted by $V_{VC}$) according to slope compensation of the first voltage. The first comparison circuit 31 is configured to make a comparison based on the first sensing signal and the second voltage for generating a first comparison signal. The second comparison circuit 35 is configured to make a comparison based on the second sensing signal and the third voltage for generating a second comparison signal. The driver circuit 40 is for driving the power stage 50 according to the first comparison signal and the second comparison signal.

Figure 2A:
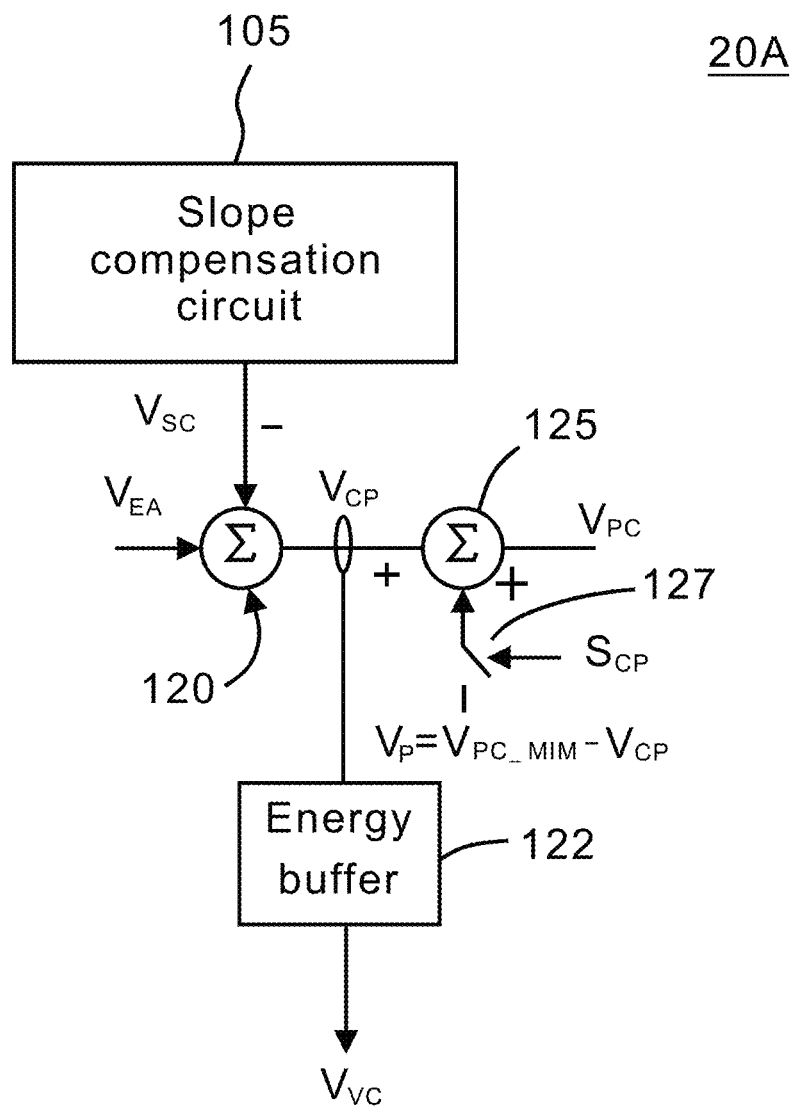
FIG. 2A is a drawing illustrating a signal conditioning circuit according to an embodiment of the present invention.

For generating the second voltage ($V_{PC}$) and the third voltage ($V_{VC}$) according to slope compensation of the first voltage ($V_{EA}$), the signal conditioning circuit 20 is configured to generate a compensated voltage signal (e.g., $V_{CP}$ in FIG. 2A; $V_{CP1}$ and $V_{CP2}$ in FIG. 2B) according to the first voltage ($V_{EA}$). The signal conditioning circuit 20 is configured to generate the second voltage ($V_{PC}$) and the third voltage ($V_{VC}$) according to the compensated voltage signal if the compensated voltage signal is greater than or equal to a voltage signal threshold while the high-side switch $SW_{HS}$ is on. The signal conditioning circuit 20 is configured to generate the second voltage ($V_{PC}$) based on the voltage signal threshold and to generate the third voltage ($V_{VC}$) according to the compensated voltage signal if the compensated voltage signal is less than the voltage signal threshold (e.g., denoted by $V_{PC\_MIN}$C) while the high-side switch $SW_{HS}$ is on. In this manner, the second voltage ($V_{PC}$) will keep at a voltage based on the voltage signal threshold, such as a minimum voltage signal (e.g., denoted by $V_{PC\_MIN}$ as illustrated below).

Figure 1B:
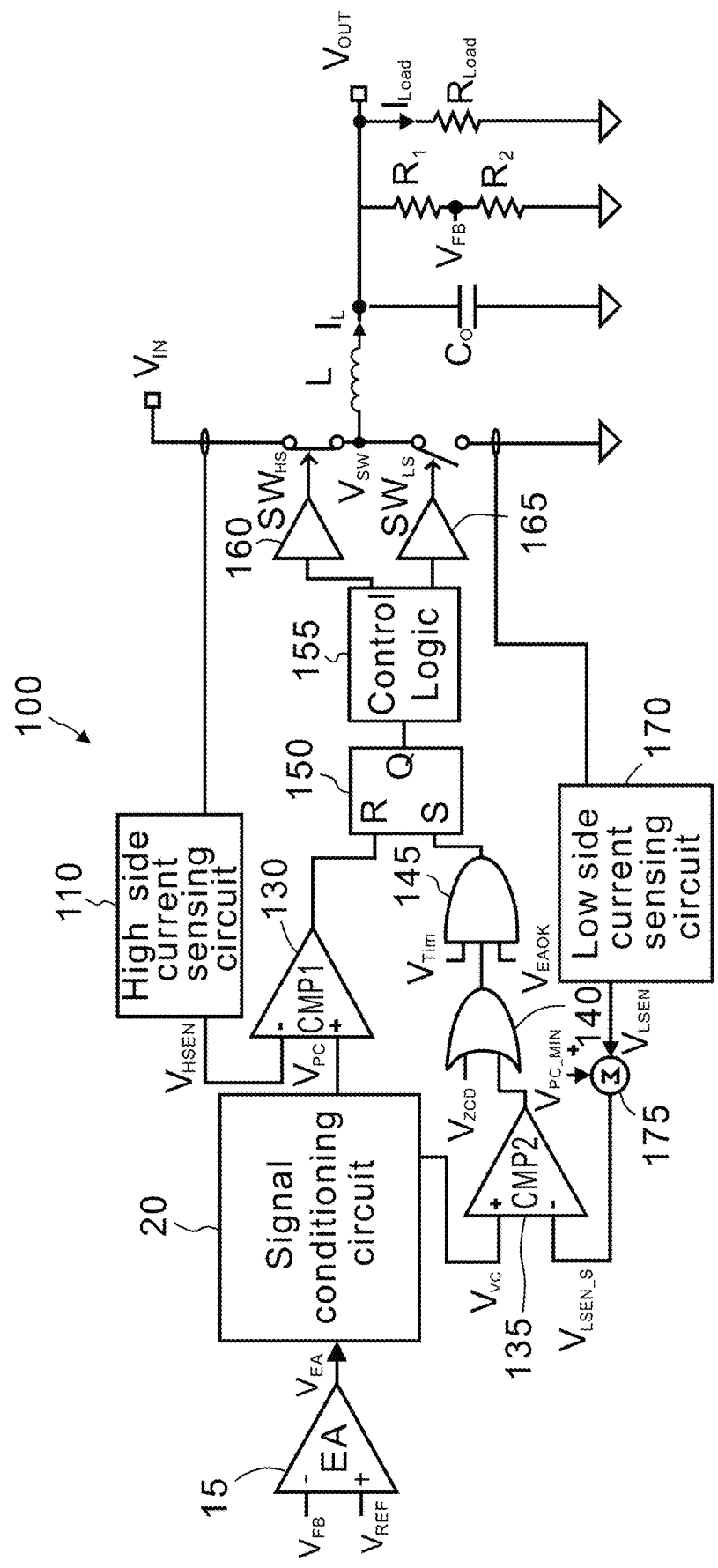
FIG. 1B is a drawing illustrating an embodiment of a control circuit with automatic frequency modulation for a DC-DC converter based on the architecture of FIG. 1A.

Refer to FIG. 1B, which is a drawing illustrating an embodiment of a control circuit with automatic frequency modulation for a DC-DC converter based on the architecture of FIG. 1A.

As shown in FIG. 1B, the control circuit 100 comprises an error amplifier (EA) 15 with a negative input receiving a feedback voltage ($V_{FB}$) and a positive input receiving a reference voltage ($V_{REF}$). The output of the error amplifier 15 is electrically connected to the signal conditioning circuit 20. The error amplifier 15 provides an error amplifier output voltage $V_{EA}$ (as an example of the first voltage mentioned above) to the signal conditioning circuit 20.

The signal conditioning circuit 20 can be implemented in various manners. Referring to FIG. 2A, as an embodiment of the signal conditioning circuit 20, a signal conditioning circuit 20A comprises a slope compensation circuit 105, a first summer circuit 120, a selector 127, and a second summer circuit 125. The slope compensation circuit 105 is for generating a slope compensation voltage signal (e.g., denoted by $V_{SC}$). The first summer circuit 120 is for receiving the error amplifier output voltage $V_{EA}$ and the slope compensation voltage signal $V_{SC}$ to output the compensated voltage signal (e.g., denoted by $V_{CP}$). The selector 127 is for outputting a compensation voltage (e.g., denoted by $V_P$) selectively according to whether the compensated voltage signal $V_{CP}$ is less than the voltage signal threshold (e.g., denoted by $V_{PC\_MIN}$). For example, a selection signal (e.g., denoted by $S_{CP}$) can be provided to control the selector 127. If the compensated voltage signal $V_{CP}$ is less than the voltage signal threshold (e.g., $V_{PC\_MIN}$), the selection signal $S_{CP}$ can be asserted and thus the selector 127 can output the compensation voltage $V_P$. The second summer circuit 125 is coupled to an output of the first summer circuit 120 and an output of the selector 127 to generate a peak compensation voltage (e.g., denoted by $V_{PC}$) (as an example of the second voltage mentioned above). The second summer circuit 125 generates the peak compensation voltage $V_{PC}$ according to the compensated voltage signal $V_{CP}$ if the compensated voltage signal $V_{CP}$ is greater than or equal to the voltage signal threshold ($V_{PC\_MIN}$) while the high-side switch $SW_{HS}$ is on, and the second summer circuit 125 generates the peak compensation voltage $V_{PC}$ based on the voltage signal threshold if the compensated voltage signal $V_{CP}$ is less than the voltage signal threshold while the high-side switch $SW_{HS}$ is on.

In FIG. 2A, for example, the signal conditioning circuit 20A further comprises an energy buffer 122 configured to generate a valley compensation voltage (e.g., denoted by $V_{VC}$) (as an example of the third voltage mentioned above) according to the compensated voltage signal $V_{CP}$ and store energy according to the valley compensation voltage $V_{VC}$ while the high-side switch $SW_{HS}$ is on.

For example, the energy buffer 122 is configured, after the high-side switch $SW_{HS}$ turns off and the low-side switch $SW_{LS}$ is on, to output the valley compensation voltage $V_{VC}$ to the second comparison circuit 35, for example, a second comparator (CMP2) 135, according to the energy stored during the high-side switch $SW_{HS}$ being on.

Referring to FIG. 1B, a high-side current sensing circuit 110 (as an example of the first sensor 11) is coupled between an input voltage ($V_{IN}$) and a negative input of the first comparator 130. The high-side current sensing circuit 110 is used for sensing a high-side current and converting the high-side current into a corresponding voltage signal. For example, the high-side current sensing circuit 110 provides a high-side sensed voltage signal ($V_{HSEN}$) to the first comparator 130 according to the high-side current by way of current-to-voltage conversion, wherein the high-side current sensing circuit 110 has a conductance $G_{C\_HS}$ that is equal to the high-side current divided by the high-side sensed voltage signal. Since the high-side current obtained when the high-side switch is on equals the current $I_L$ flowing through the inductor (L) in FIG. 1B, the conductance $G_{C\_HS}$ can be expressed as: $G_{C\_HS}=I_L/V_{HSEN}$.

The output of the first comparator 130 is electrically connected to a first input of a logic circuit 150, such as a reset input (R) of a flip flop or electronic latch.

The output of the energy buffer 122, as shown in FIG. 2A, is electrically coupled to the positive input of the second comparator (CMP2) 135, as shown in FIG. 1B.

A low-side current sensing circuit 170, as an example of the second sensor 12, is used for sensing a low-side current and converting the low-side current into a corresponding voltage signal. For example, the output of the low-side current sensing circuit 170 provides a low-side sense voltage signal ($V_{LSEN}$) according to the low-side current by way of current-to-voltage conversion, wherein the low-side current sensing circuit 170 has a conductance $G_{C\_LS}$ that is equal to the low-side current divided by the low-side sensed voltage signal. Since the low-side current obtained when the low-side switch is on equals the current $I_L$, the conductance $G_{C\_LS}$ can be expressed as: $G_{C\_LS}=I_L/V_{LSEN}$.

As shown in FIG. 1B, for example, the control circuit 100 further comprises a third summer circuit 175, coupled between the low-side current sensing circuit 170 and the second comparator 135, for outputting a summation signal based on the second sensing signal and a threshold voltage signal. The second comparator 135 has a positive input to receive the valley compensation voltage $V_{VC}$ and a negative input to receive the summation signal so as to make the comparison based on the second sensing signal and the valley compensation voltage $V_{VC}$ for generating the second comparison signal. As illustrated in FIG. 1B, a minimum peak compensation voltage, as an example of $V_{PC\_MIN}$, is input to a second input of the third summer circuit 175. The output of the third summer circuit 175 provides the summation signal, for example, a summed low-side sensed voltage signal ($V_{LSEN\_S}$), to the negative input of the second comparator 135.

The output of the second comparator 135 is electrically connected a second input of an OR gate 140. The first input of the OR gate 140 receives a zero crossing detection voltage ($V_{ZCD}$). The output of the OR gate is connected to a second input of a 3 input AND gate 145. The first input of the 3 input AND gate 145 receives a timer voltage ($V_{TIM}$). The third input of the 3 input AND gate 145 receives an output level detection voltage ($V_{EAOK}$) of the error amplifier (EA) 15. The output of the 3 input AND gate 145 is electrically connected to a second input of the logic circuit 150, such as a set (S) input of the flip flop.

The output of the logic circuit 150, such as a Q output of the flip flop is electrically connected to the input of a control logic circuit 155. The first output of the control logic circuit 155 is electrically connected to an input of a first driving buffer 160. The second output of the control logic circuit 155 is electrically connected to an input of a second driving buffer 165.

The output of the first driving buffer 160 is electrically connected to the high-side switch $SW_{HS}$. The output of the second driving buffer 165 is electrically connected to the low-side switch $SW_{LS}$.

In an embodiment of the present invention, the first driving buffer 160 and the high-side switch $SW_{HS}$ are realized in a transistor or MOSFET and the second driving buffer 165 and the low-side switch $SW_{LS}$ are realized in a transistor or MOSFET.

A first end of an inductor (e.g., denoted by L) is electrically connected to a node between the high-side switch $SW_{HS}$ and the low-side switch $SW_{LS}$, wherein the node provides a voltage denoted by $V_{SW}$. A second end of the inductor L is electrically connected to an output pin or terminal, which provides an output voltage ($V_{OUT}$).

An output capacitor (e.g., denoted by $C_O$) is electrically connected between the second end of the inductor L and reference ground.

A first end of a first resistor (e.g., denoted by $R_1$) is electrically connected to the second end of the inductor L. A second end of the first resistor $R_1$ is electrically connected to a first end of a second resistor (e.g., denoted by $R_2$). A second end of the second resistor $R_2$ is connected to reference ground. A feedback node is formed between the first resistor $R_1$ and the second resistor $R_2$. The feedback node is electrically connected to the negative input of the error amplifier 15 which provides the feedback voltage ($V_{FB}$) to the error amplifier 15.

A load, such as a resistor (e.g., denoted by $R_{LOAD}$), is connected between the second end of the inductor L and reference ground.

This arrangement disposes the output capacitor $C_O$, the combined first resistor $R_1$ and the second resistor $R_2$, and the resistor $R_{LOAD}$ to be connected in parallel.

Figure 2B:
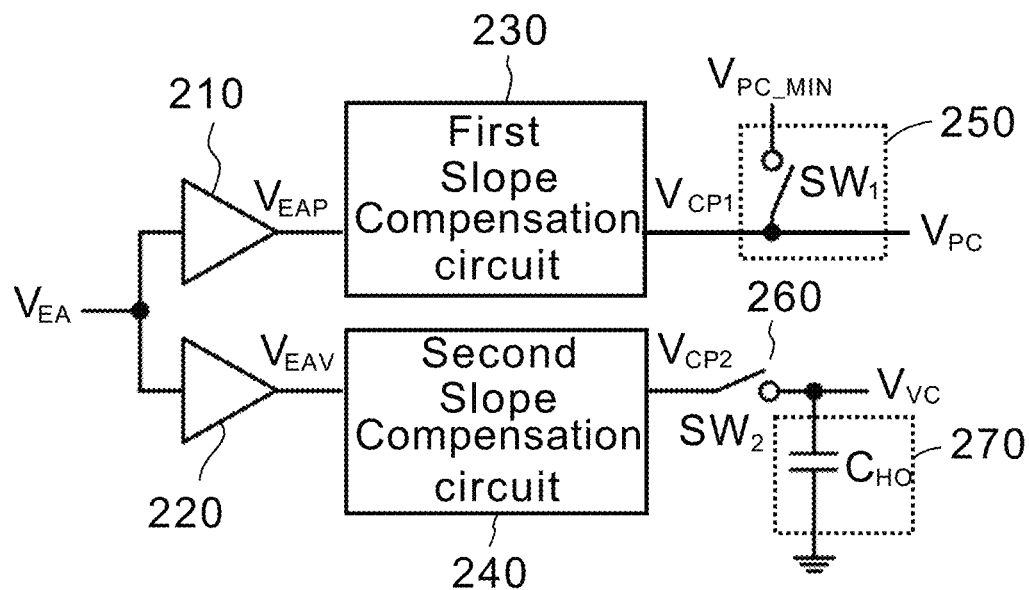
FIG. 2B is a drawing illustrating a signal conditioning circuit according to an embodiment of the present invention.

Referring to FIG. 2B, as another embodiment of the signal conditioning circuit 20, a signal conditioning circuit 20B comprises a first slope compensation circuit 230, a selector 250, and a first output terminal. The first slope compensation circuit 230 is for generating a first compensated voltage signal (e.g., denoted by $V_{CP1}$) according to the error amplifier output voltage $V_{EA}$ as the compensated voltage signal as mentioned above. The selector 250, for example, a first switch $SW_1$, is for selectively outputting a voltage based on the voltage signal threshold (e.g., denoted by $V_{PC\_MIN}$) according to whether the first compensated voltage signal $V_{CP1}$ is less than the voltage signal threshold ($V_{PC\_MIN}$). The first output terminal is coupled to an output of the first slope compensation circuit 230 and an output of the selector 250 to output the peak compensation voltage $V_{PC}$ (as an example of the second voltage mentioned above). The signal conditioning circuit 20B outputs the peak compensation voltage $V_{PC}$ according to the first compensated voltage signal $V_{CP1}$ through the first output terminal if the first compensated voltage signal $V_{CP1}$ is greater than or equal to the voltage signal threshold while the high-side switch $SW_{HS}$ is on, and the signal conditioning circuit 20B outputs the voltage based on the voltage signal threshold as the peak compensation voltage $V_{PC}$ through the first output terminal if the first compensated voltage signal $V_{CP1}$ is less than the voltage signal threshold while the high-side switch $SW_{HS}$ is on.

For example, the signal conditioning circuit 20B further comprises a second slope compensation circuit 240, an output switch 260, an energy buffer 270 (e.g., a capacitor $C_{HO}$ coupled to the output switch 260, and a second output terminal. The second slope compensation circuit 240 is for generating a second compensated voltage signal (e.g., denoted by $V_{CP2}$) according to the error amplifier output voltage $V_{EA}$. The output switch 260, for example, a second switch $SW_2$, is coupled between the second output terminal and the second slope compensation circuit 240 and the energy buffer 270 is coupled to the second output terminal. While the high-side switch $SW_{HS}$ is on, the output switch 260 turns on so that the signal conditioning circuit 20B outputs the second compensated voltage signal $V_{CP2}$ as the valley compensation voltage $V_{VC}$ (as an example of the third voltage mentioned above) through the second output terminal and the energy buffer 270 stores energy according to the valley compensation voltage $V_{VC}$.

For example, after the high-side switch $SW_{HS}$ turns off and the low-side switch $SW_{LS}$ is on, the output switch 260 turns off so that the energy buffer 270 output the valley compensation voltage $V_{VC}$ to the second comparison circuit 35 (e.g., the second comparator (CMP2) 135) according to the energy stored during the high-side switch $SW_{HS}$ being on.

Referring to FIG. 2B, for example, the error amplifier output voltage $V_{EA}$ is input into a peak buffer 210. The output of the peak buffer 210 provides an error amplifier peak voltage ($V_{EAP}$). The output of the peak buffer 210 is electrically connected to the first slope compensation circuit 230. The output of the first slope compensation circuit 230 provides the first compensated voltage signal $V_{CP1}$. The output of the first slope compensation circuit 230 is connected to the selector 250. When the selector 250 is turned on and a minimum peak compensation voltage ($V_{PC\_MIN}$) is output as a peak compensation voltage ($V_{PC}$). When the first switch 250 is turned off and the first compensated voltage signal ($V_{CP1}$) is output as the peak compensation voltage ($V_{PC}$).

The error amplifier output voltage $V_{EA}$ is also input into a valley buffer 220. The output of the valley buffer 220 provides an error amplifier valley voltage ($V_{EAV}$). The output of the valley buffer 220 is electrically connected to the second slope compensation circuit 240. The output of the second slope compensation circuit 240 provides the second compensated voltage signal $V_{CP2}$. The output of the second slope compensation circuit 240 is connected to the output switch 260. When the second switch 260 is turned on, the second compensated voltage signal $V_{CP2}$ is output as the valley compensation voltage $V_{VC}$ and the energy buffer 270 such as the capacitor $C_{HO}$ is charged. When the output switch 260 is turned off, the capacitor $C_{HO}$ is discharged and provides a discharging voltage as the valley compensation voltage $V_{VC}$.

In FIG. 2B, when the first compensated voltage signal $V_{CP1}$ is greater than $V_{PC\_MIN}$ then the first compensated voltage signal $V_{CP1}$ is approximately equal to the second compensated voltage signal $V_{CP2}$.

When the first compensated voltage signal $V_{CP1}$ is less than $V_{PC\_MIN}$ then the first switch $SW_1$ is on, and the peak compensation voltage $V_{PC}$ equals $V_{PC\_MIN}$.

When the high-side switch $SW_{HS}$ is on, then the second switch $SW_2$ is on.

When the low-side switch $SW_{LS}$ is on, then the second switch $SW_2$ is off.

Likewise, as shown in FIG. 2A, the selector 127 outputs a compensation voltage $V_P$ selectively according to a comparison between the compensated voltage signal $V_{CP}$ and the minimum peak compensation voltage $V_{PC\_MIN}$. When the compensated voltage signal $V_{CP}$ is less than $V_{PC\_MIN}$, the selector 127 outputs the compensation voltage $V_P$ to the second input of the second summer circuit 125, wherein $V_P$ equals $V_{PC\_MIN}$ minus $V_{CP}$. The peak compensation voltage $V_{PC}$ is thus equal to $V_{PC\_MIN}$.

In addition, when the output level detection voltage $V_{EAOK}$ is asserted (e.g., at a high level, then $V_{EA}$ is greater than $V_{REF2}$ and $V_{PC\_MIN}$ is greater than $V_{REF2}$ minus $V_X$, wherein $V_X$ is a DC level shift voltage of the buffer (e.g., 210, 220 in FIG. 2B).

Hence, the circuit conditioning circuit 20A or 20B has similar operations for generating the peak compensation voltage $V_{PC}$ and the valley compensation voltage $V_{VC}$. In particular, the operations that result in the peak compensation voltage $V_{PC}$ equal to $V_{PC\_MIN}$ when the compensated voltage signal (e.g., $V_{CP}$ in FIG. 2A; or $V_{CP1}$ in FIG. 2B) is less than $V_{PC\_MIN}$ can be referred to as $V_P$ compensation voltage mechanism.

Figure 3B:
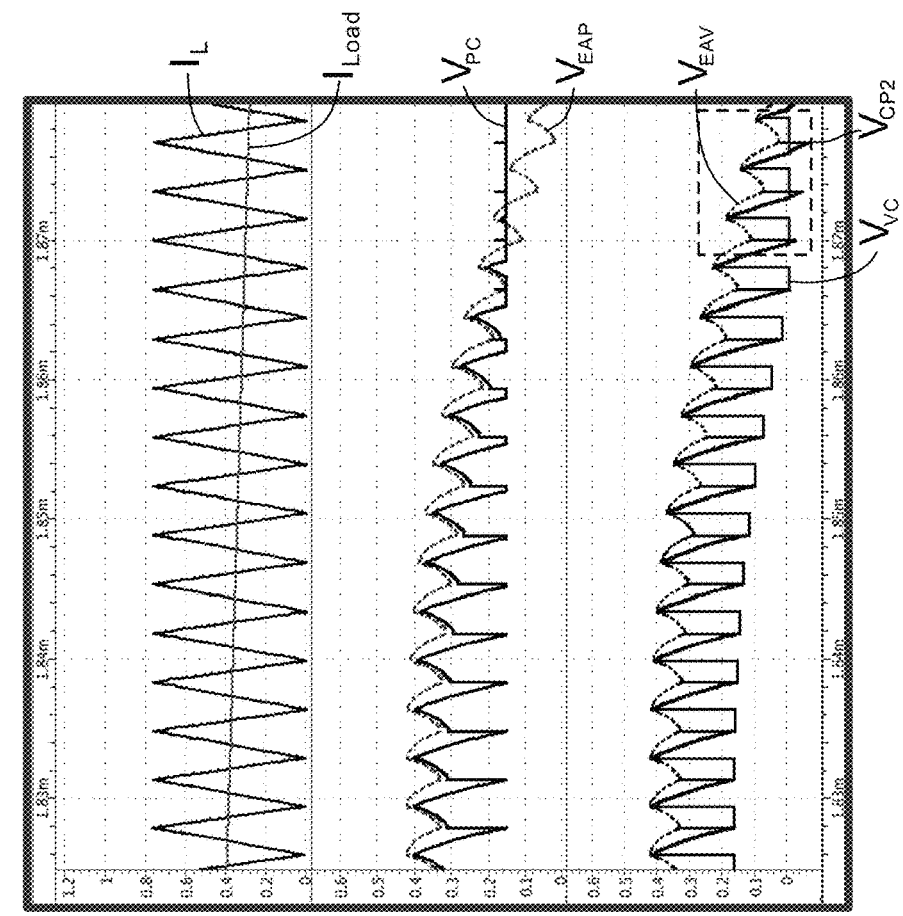
FIG. 3B is a diagram illustrating an enlarged view of a section of the waveforms of circuit voltages and currents illustrated in FIG. 3A according to an embodiment of the present invention.
Figure 3A:
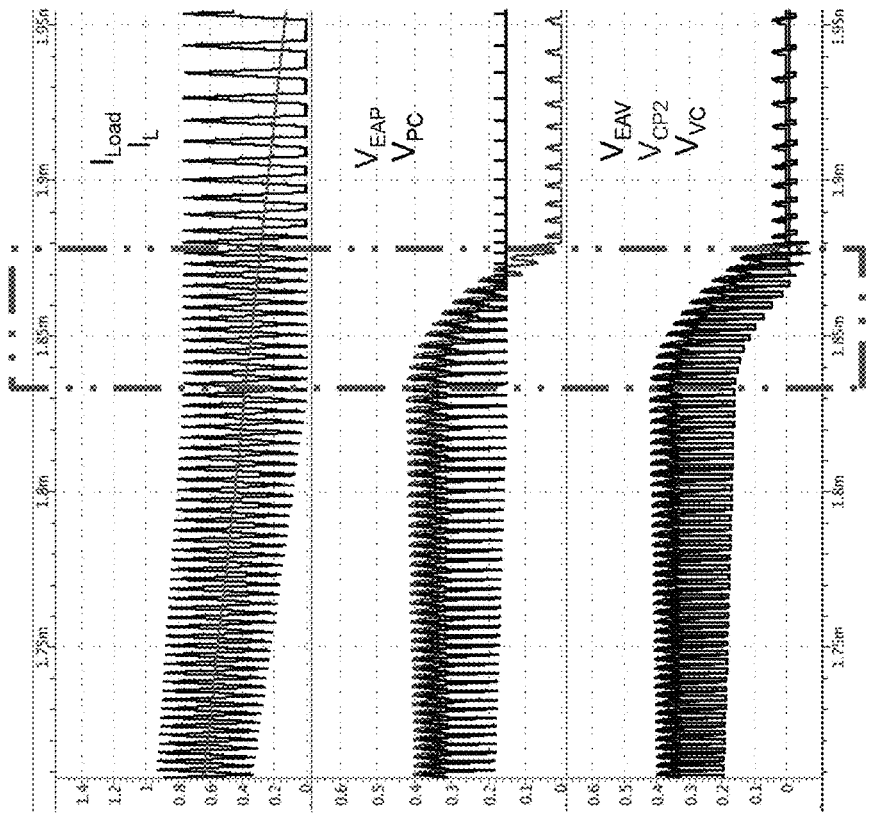
FIG. 3A is a diagram illustrating waveforms of circuit voltages and currents according to an embodiment of the present invention.
Figure 3C:
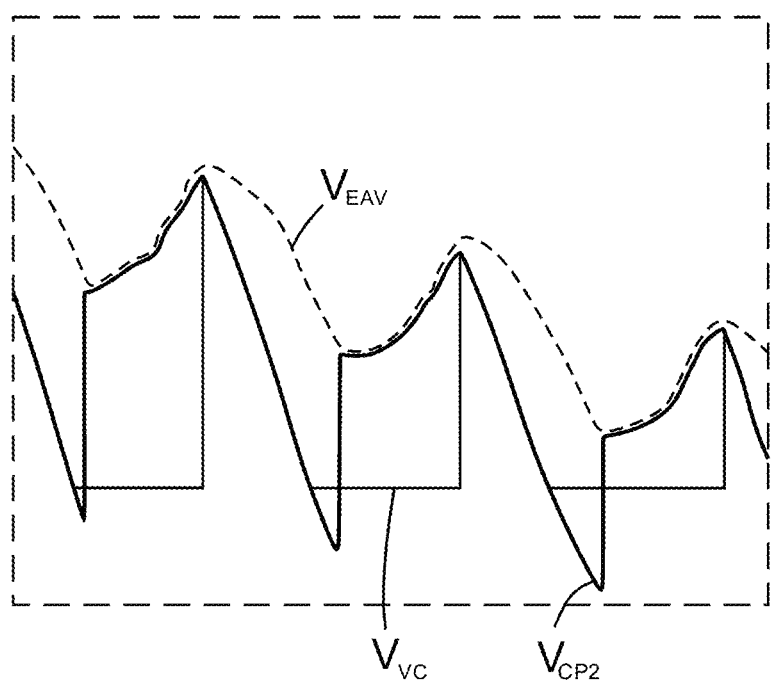
FIG. 3C is a diagram illustrating an enlarged view of a section of the waveforms of circuit voltages illustrated in FIG. 3B.

Refer to FIG. 3A, which is a diagram illustrating waveforms of circuit voltages and currents according to an embodiment of the present invention and to FIG. 3B, which is a diagram illustrating an enlarged view of a section of the waveforms of circuit voltages and currents illustrated in FIG. 3A according to an embodiment of the present invention. In addition, FIG. 3C illustrates an enlarged view of a section of the waveforms of circuit voltages illustrated in FIG. 3B.

The waveforms shown in FIG. 3B are enlarged waveforms that are outlined in a rectangle in FIG. 3A.

Shown at the top of FIGS. 3A and 3B, the current $I_L$ (the current flowing through the inductor L in FIG. 1) is a triangular waveform and $I_{LOAD}$ (the current flowing through the load resistor ($R_{LOAD}$) 197 in FIG. 1) is a slowly descending slope.

Shown in the center of FIGS. 3A and 3B, are $V_{EAP}$ (the peak voltage output from the error amplifier (EA) 15 in FIG. 1B or the voltage output from the peak buffer 210 in FIG. 2B) and $V_{PC}$ (the voltage input to the positive input of the first comparator (CMP1) 130 in FIG. 1B).

Shown at the bottom of FIGS. 3A and 3B, are $V_{EAV}$ (the valley voltage output from the error amplifier (EA) 15 in FIG. 1B or the voltage output from the valley buffer 220 in FIG. 2B), $V_{CP2}$ (voltage output from the second slope compensation circuit 240 in FIG. 2B), and $V_{VC}$ (voltage input to the positive input of the second comparator (CMP2) in FIG. 1B).

As described in regard to FIG. 2B, FIGS. 3A and 3B show that when $V_{CP1}$ is greater than $V_{PC\_MIN}$ then $V_{CP1}$ is approximately equal to $V_{CP2}$. When $V_{CP1}$ is less than $V_{PC\_MIN}$ then the first switch (SW$_1$) is ON, and $V_{PC}$ equals $V_{PC\_MIN}$.

As shown in FIGS. 3A and 3B, the waveforms flatten when $V_{PC}$ equals $V_{PC\_MIN}$.

Figure 4:
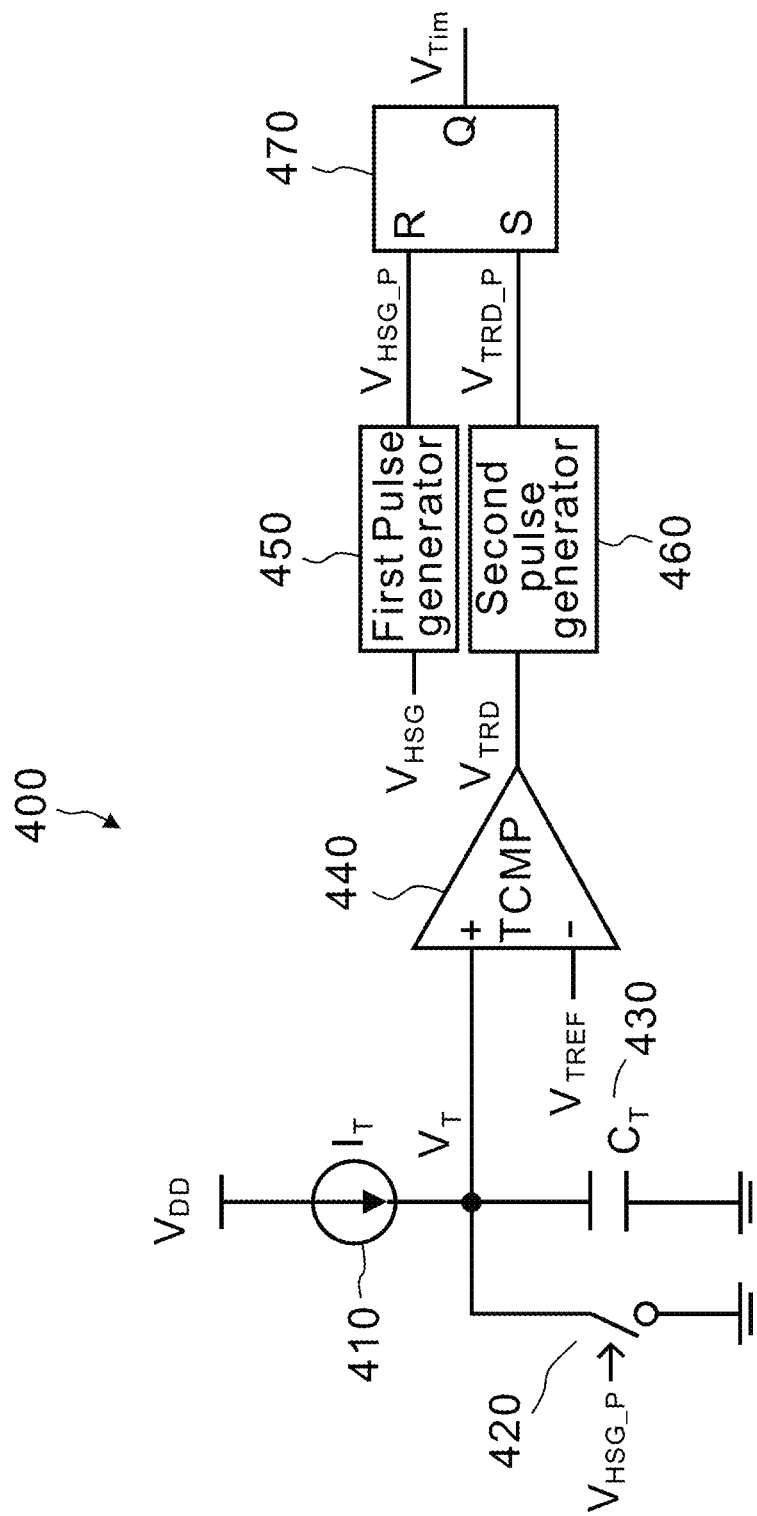
FIG. 4 is a drawing illustrating a final switching frequency timer circuit according to an embodiment of the present invention.

Refer to FIG. 4, which is a drawing illustrating a final switching frequency timer circuit according to an embodiment of the present invention.

The final switching frequency timer circuit 400 comprises an input voltage ($V_{DD}$) that becomes a current source 410 supplying a timer current ($I_T$) to a node. A voltage ($V_T$) is provided at the node.

A reset voltage switch 420 is triggered by a voltage signal ($V_{HSG\_P}$) and is connected between the node and reference ground. A timer capacitor ($C_T$) 430 is connected between the node and reference ground. A positive input of a timer comparator (TCMP) 440 is also connected to the node. Therefore, the voltage ($V_T$) is input to the positive input of the timer comparator 440. A timer reference voltage ($V_{TREF}$) is provided to a negative input of the timer comparator 440.

The output of the timer comparator 440 is electrically connected to a second pulse generator 460 and allows the timer comparator 440 to provide a voltage ($V_{TRD}$) to the second pulse generator 460. The output of the second pulse generator 460 is electrically connected to a set input (S) of a flip flop 470 and allows the second pulse generator 460 to supply a voltage ($V_{TRD\_P}$) to the flip flop 470.

A first pulse generator 450 receives a voltage (e.g., denoted by $V_{HSG}$). The output of the first pulse generator 450 is electrically connected to a reset input (R) of the flip flop 470 and allows the first pulse generator 450 to provide a voltage ($V_{HSG\_P}$) to the flip flop 470. The output (Q) of the flip flop 470 outputs a timer voltage (e.g., denoted by $V_{TIM}$).

In this embodiment the final switching frequency ($F_S$) equals $I_T$ divided by the product of $C_T$ and $V_{TREF}$, as expressed by a formula $F_S = I_T/(C_T * V_{TREF})$.

Figures 5A, 5B:
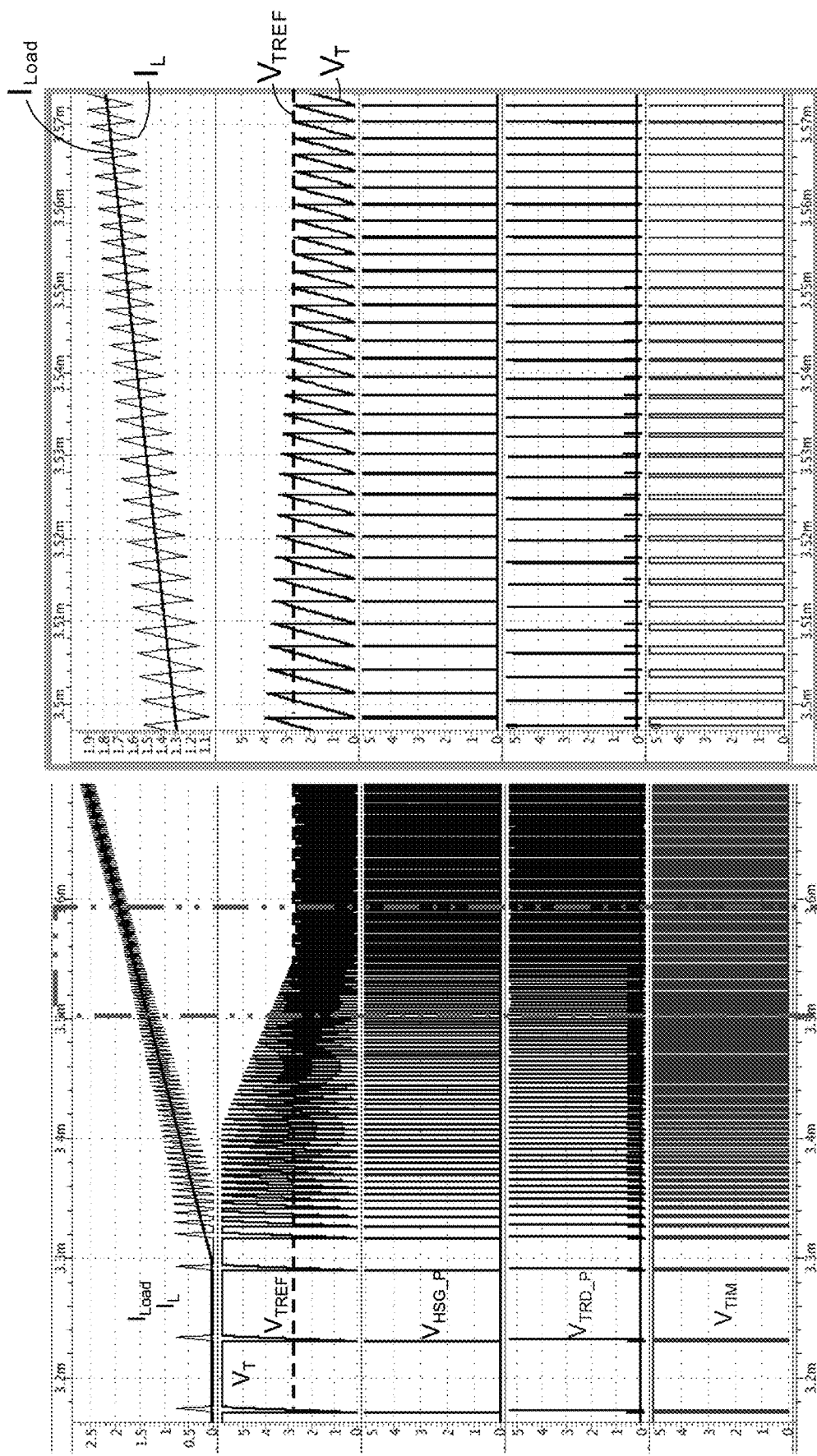
FIG. 5A is a diagram illustrating waveforms of circuit voltages and currents according to an embodiment of the present invention.
FIG. 5B is a diagram illustrating an enlarged section of the waveforms of circuit voltages and currents shown in FIG. 5A according to an embodiment of the present invention.

Refer to FIG. 5A, which is a diagram illustrating waveforms of circuit voltages and currents according to an embodiment of the present invention, and refer to FIG. 5B, which is a diagram illustrating an enlarged section of the waveforms of circuit voltages and currents shown in FIG. 5A according to an embodiment of the present invention.

The waveforms shown in FIG. 5B are enlarged waveforms that are outlined in a rectangle in FIG. 5A.

Shown at the top of FIGS. 5A and 5B, the load current ($I_{LOAD}$) and the inductor current ($I_L$) slowly increasing.

Just below the $I_{LOAD}$ and $I_L$ waveforms, FIGS. 5A and 5B show waveforms for $V_T$ (the voltage at the node and input to the positive input of the timer comparator 440 in FIG. 4) and $V_{TREF}$ (the voltage input to the negative input of the timer comparator 440 in FIG. 4).

Next down, FIGS. 5A and 5B show the waveform for $V_{HSG\_P}$ (the voltage output from the first pulse generator 450 in FIG. 4).

Next down, FIGS. 5A and 5B show the waveform for $V_{TRD\_P}$ (the voltage output from the second pulse generator 460 in FIG. 4).

Shown at the bottom of FIGS. 5A and 5B is the waveform for $V_{TIM}$ (the timer voltage output from the flip flop 470 and the final switching frequency timer circuit 400 in FIG. 4).

Referring to FIG. 1B, the $V_{TIM}$ signal is input into the first input of the 3 input AND gate 145.

Following are frequency modulation requirements for the control circuit with automatic frequency modulation for the DC-DC converter of an embodiment of the present invention.

Frequency modulation current ($I_{FM}$) minus the peak-to-peak current ($I_{PP}$) of the final switching frequency is greater than zero (e.g., expressed by $I_{FM} - I_{PP} > 0$). When the frequency modulation current ($I_{FM}$) minus the peak-to-peak current ($I_{PP}$) is greater than zero, the switching frequency ($F_{SW}$) is reduced (e.g., expressed by $I_{FM} - I_{PP} > 0$, $F_{SW}\downarrow$). The peak-to-peak current $I_{PP}$ equals $\Delta I_L$ equals $V_{OUT}$ divided by the product of L (inductor) and the final switching frequency ($F_S$) times the result of ($1 - V_{OUT}$) divided by $V_{IN}$, as expressed below:

$$I_{pp} = \Delta I_L = \frac{V_{OUT}}{L \cdot F_S}\left(1 - \frac{V_{OUT}}{V_{IN}}\right).$$

Frequency modulation current ($I_{FM}$) equals inductor current peak ($I_{LP}$) minus inductor current valley ($I_{LV}$), that is, $I_{FM}=I_{LP}-I_{LV}$.

In an embodiment of the frequency modulation control circuit of the present invention, when the compensated voltage signal ($V_{CP}$) is greater or equal to the minimum peak compensation voltage ($V_{PC\_MIN}$) then the product of $G_{C\_HS}$ and $V_{PC}$ is greater than or equal to $I_{LP\_MIN}$ ($V_{CP} \geq V_{PC\_MIN} \rightarrow G_{C\_HS} V_{PC} \geq I_{LP\_MIN}$). The inductor peak current equals the product of $G_{C\_HS}$ and $V_{CP}$, (e.g., as expressed by $I_{LP}=G_{C\_HS} V_{CP}$). The inductor valley current equals the product of $G_{C\_LS}$ and $V_{CP}$ (e.g., as expressed by $I_{LV}=G_{C\_LS} V_{CP}$).

In an embodiment of the present invention the frequency modulation control circuit the following equations are implemented.

Figure 6B:
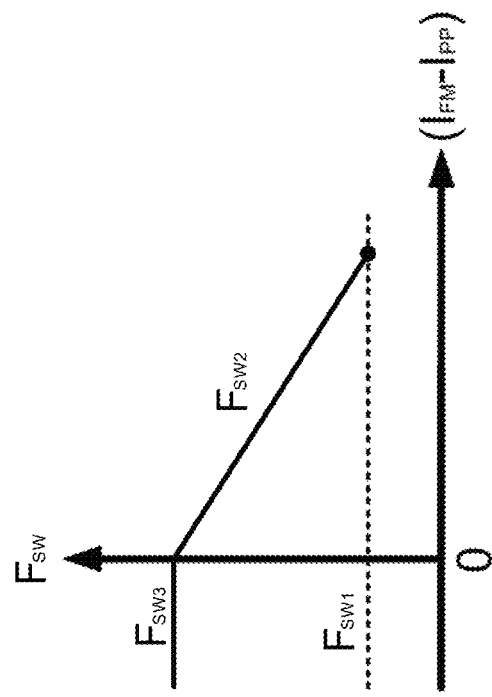
FIG. 6B is a graph illustrating the ($I_{FM}$-$I_{PP}$) relationship with frequency modulation in the control system according to an embodiment of the present invention.
Figure 6A:
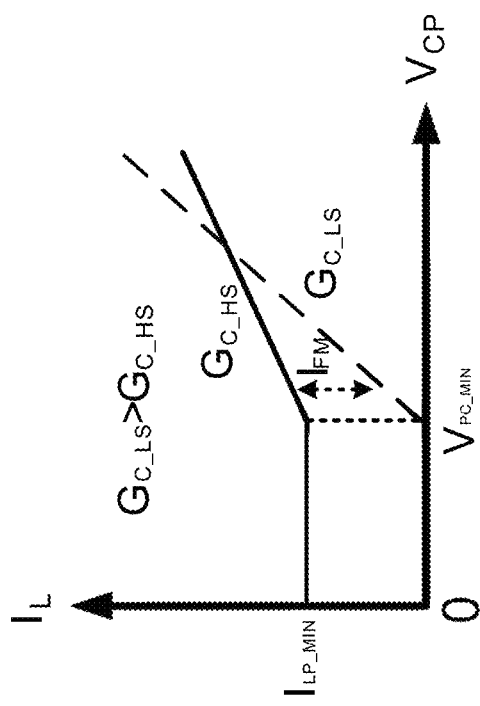
FIG. 6A is a graph illustrating the relationship between $I_{FM}$ and $G_{C\_HS}$, $G_{C\_LS}$ with frequency modulation in the control system according to an embodiment of the present invention.

Refer to FIG. 6A, which is a graph illustrating the relationship between $I_{FM}$ and $G_{C\_HS}$, $G_{C\_LS}$ with frequency modulation in the control system according to an embodiment of the present invention and to FIG. 6B, which is a graph illustrating the ($I_{FM}-I_{PP}$) relationship with frequency modulation in the control system according to an embodiment of the present invention.

As shown in FIGS. 6A and 6B, when $G_{C\_HS}$ is less than $G_{C\_LS}$ (i.e., $G_{C\_HS}<G_{C\_LS}$), (in continuous current mode (CCM)) then ($I_{FM}-I_{PP}$) is greater than zero (i.e., ($I_{FM}-I_{PP}$)>0).

Also, the following equations are utilized:

$$F_{SW1} = F_{SW\_MIN} = \frac{V_{OUT}}{L \cdot I_{FM\_MAX}}\left(1 - \frac{V_{OUT}}{V_{IN}}\right) = \frac{V_{OUT}}{L \cdot I_{LP\_MIN}}\left(1 - \frac{V_{OUT}}{V_{IN}}\right);$$

and $$F_{SW2} = \frac{V_{OUT}}{L \cdot I_{FM}}\left(1 - \frac{V_{OUT}}{V_{IN}}\right).$$

Also, as the load current ($I_{LOAD}$) decreases, ($I_{FM}-I_{PP}$) increases, and $F_{SW}$ decreases.

When ($I_{FM}-I_{PP}$) is less than or equal to zero (($I_{FM}-I_{PP}$) ≤0) then $$F_{SW3} = F_S = \frac{V_{OUT}}{L \cdot I_{PP}}\left(1 - \frac{V_{OUT}}{V_{IN}}\right).$$

Figure 7:
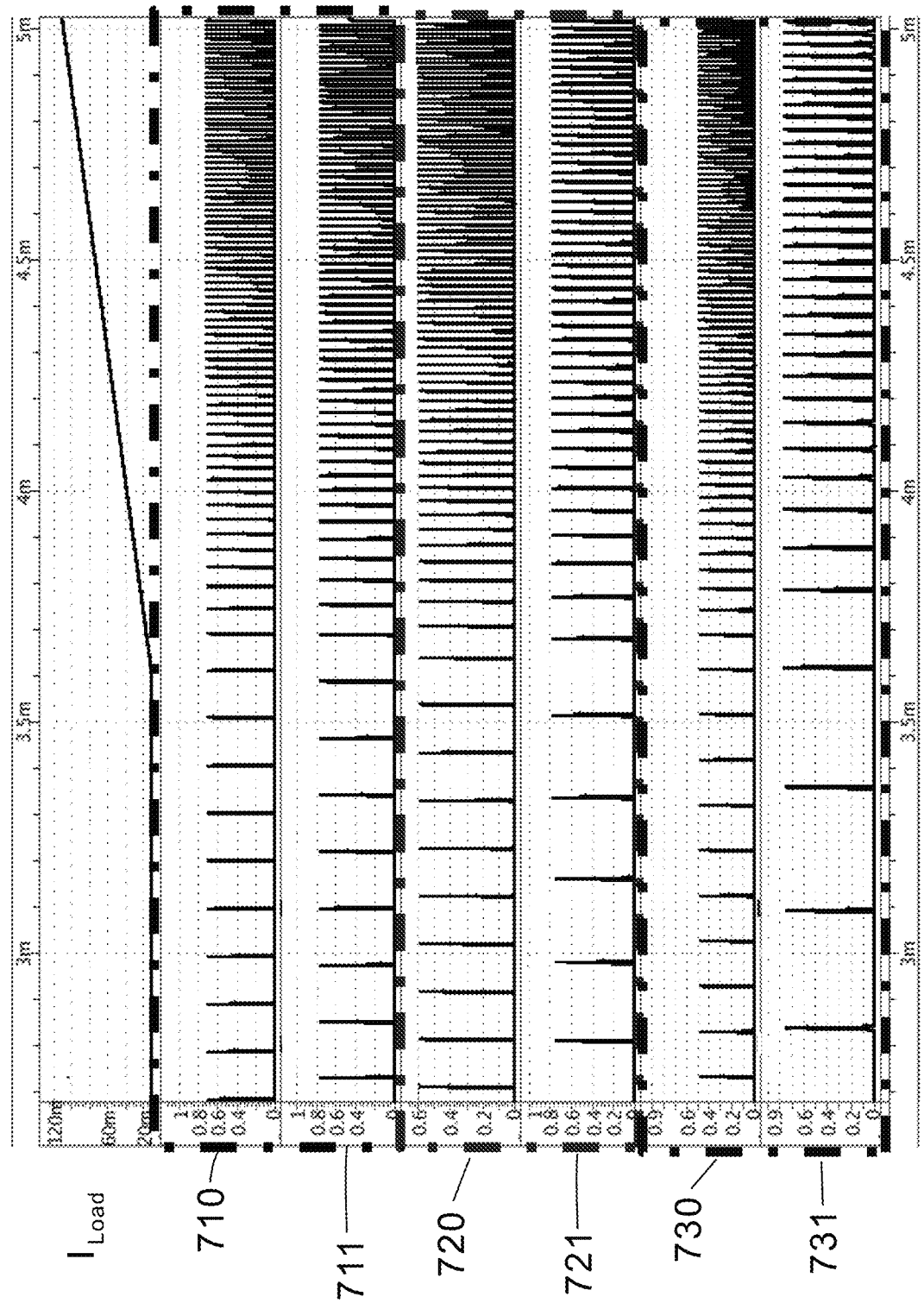
FIG. 7 is a diagram illustrating simulation results with and without the $V_P$ compensation voltage mechanism according to an embodiment of the present invention.

Refer to FIG. 7, which is a diagram illustrating simulation results without the $V_P$ compensation voltage mechanism (as indicated by the waveforms denoted by 710, 720, 730) and results with the $V_P$ compensation voltage mechanism (as indicated by the waveforms denoted by 711, 721, 731) according to an embodiment of the present invention.

As shown in FIG. 7, without the $V_P$ compensation voltage mechanism, the waveforms of $I_L$, as indicated by waveforms 710, 720, 730, show that when the inductance of the inductor L equals, for example, 4.7 µH, 6.8 µH, 10 µH, respectively, the corresponding current $I_L$ for L=4.7 µH is greater than the corresponding current $I_L$ for L=6.8 µH, and the corresponding current $I_L$ for L=6.8 µH is greater than the corresponding current $I_L$ for L=10 µH.

With the $V_P$ compensation voltage mechanism ($I_{LP\_MIN}$ is approximately 0.8 A for example) with the relationship for $I_{LP\_MIN}$ equal to $G_{C\_HS}V_{PC\_MIN}$, the waveforms of $I_L$, as indicated by waveforms 711, 721, 731, show that when the inductance of the inductor L equals, for example, 4.7 µH, 6.8 µH, 10 µH, respectively, the corresponding current $I_L$ for L=4.7 µH is approximately equal to that for L=6.8 µH and that for L=10 µH. In the same load current ($I_{LOAD}$) and inductance value, the switching frequency without the $V_P$ compensation voltage mechanism is higher than the switching frequency with $V_P$ compensation voltage mechanism, so the switching loss for the switching frequency without the $V_P$ compensation voltage mechanism is more than that for the switching frequency with the $V_P$ compensation voltage mechanism.

Figure 8:
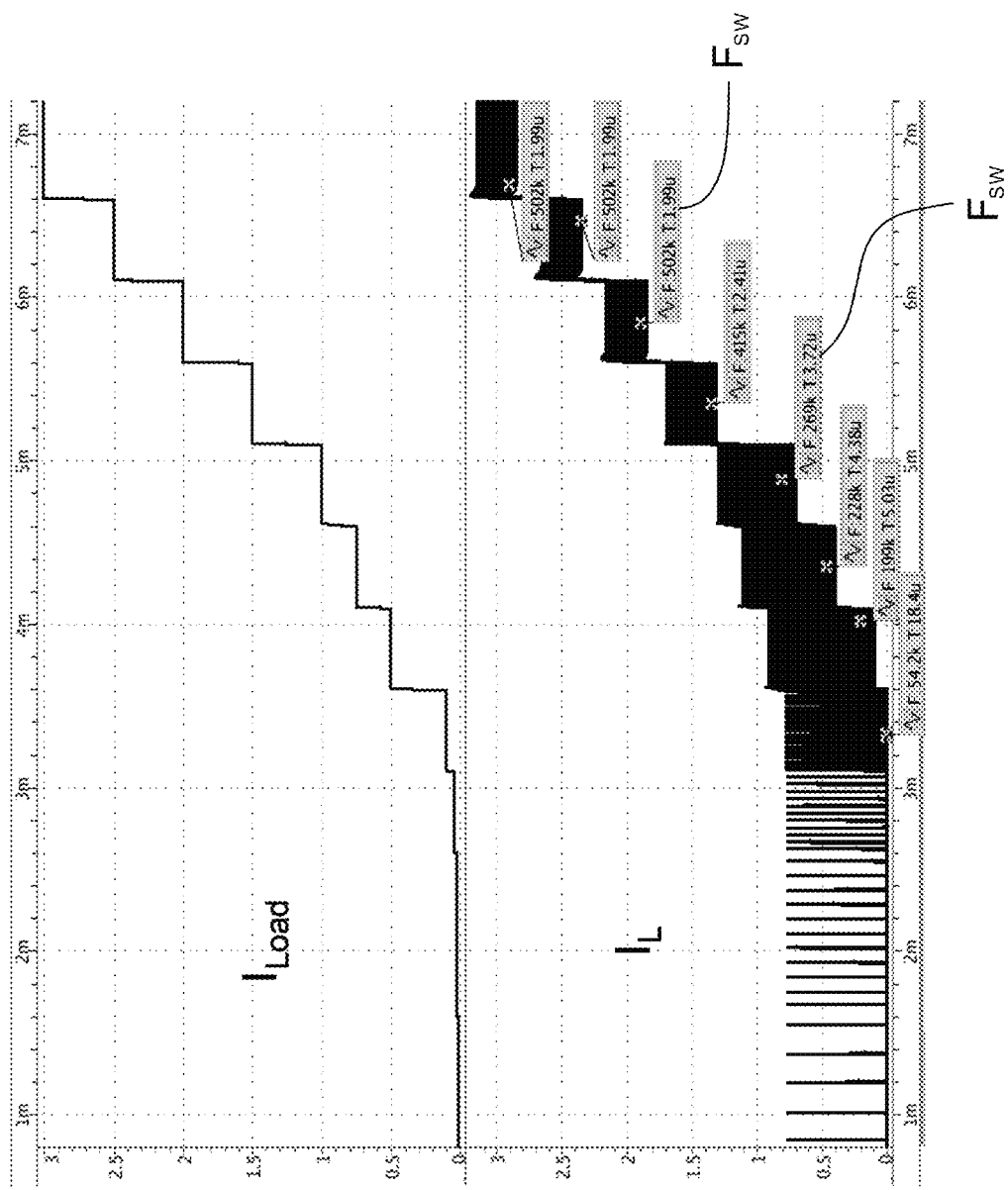
FIG. 8 is a diagram illustrating simulation results with automatic frequency modulation according to an embodiment of the present invention.

Refer to FIG. 8, which is a diagram illustrating simulation results with automatic frequency modulation according to an embodiment of the present invention.

As shown in FIG. 8, when the final switching frequency ($F_S$) is approximately 500 kHz and the load current ($I_{LOAD}$) increases, $F_{SW}$ increases.

In addition, $$\text{Efficiency} = \eta(\%) = \frac{P_{OUT}}{P_{OUT} + P_{LOSS}} \times 100(\%).$$

The power loss ($P_{LOSS}$) consists of conduction loss, switching loss, etc. The switching loss decreases causing $P_{LOSS}$ to decrease and resulting in an increase in efficiency $\eta$ (%) when the frequency ($F_{SW}$) decreases.

The control circuit with automatic frequency modulation for a DC-DC converter of the present invention has advantages of at least an easy to design frequency modulation range, enough energy by the $V_P$ compensation voltage mechanism to resist zero crossing detection (ZCD) level variation, and improved efficiency between a light load and a mid-light load with the $V_P$ compensation voltage mechanism and the automatic frequency modulation mechanism.

While the present disclosure has been described by means of specific embodiments, numerous modifications and variations could be made thereto by those skilled in the art without departing from the scope and spirit of the present disclosure set forth in the claims.

What is claimed is:

1. A control circuit for controlling a DC-DC converter, the DC-DC converter including a high-side switch and a low-side switch connected to the high-side switch, the control circuit comprising: a first sensor configured to receive a first side current associated with the high-side switch for generating a first sensing signal; a second sensor configured to receive a second side current associated with the low-side switch for generating a second sensing signal; an error amplifier configured to receive a feedback voltage and a reference voltage for generating a first voltage; a signal conditioning circuit configured to receive the first voltage for generating a second voltage and a third voltage, wherein the signal conditioning circuit is configured to generate a compensated voltage signal according to the first voltage, the signal conditioning circuit is configured to generate the second voltage and the third voltage according to the compensated voltage signal if the compensated voltage signal is greater than or equal to a voltage signal threshold while the high-side switch is on, and the signal conditioning circuit is configured to generate the second voltage based on the voltage signal threshold and to generate the third voltage according to the compensated voltage signal if the compensated voltage signal is less than the voltage signal threshold while the high-side switch is on; a first comparison circuit configured to make a comparison based on the first sensing signal and the second voltage for generating a first comparison signal; a second comparison circuit configured to make a comparison based on the second sensing signal and the third voltage for generating a second comparison signal; and a driver circuit for driving a power stage according to the first comparison signal and the second comparison signal.

2. The control circuit according to claim 1, wherein the signal conditioning circuit is configured to generate the third voltage according to the compensated voltage signal and store energy according to the third voltage while the high-side switch is on.

3. The control circuit according to claim 2, wherein the signal conditioning circuit is configured, after the high-side switch turns off and the low-side switch is on, to output the third voltage to the second comparison circuit according to the energy stored during the high-side switch being on.

4. The control circuit according to claim 1, wherein the signal conditioning circuit comprises:
  a slope compensation circuit for generating a slope compensation voltage signal;
  a first summer circuit for receiving the first voltage and the slope compensation voltage signal to output the compensated voltage signal;
  a selector for outputting a compensation voltage selectively according to whether the compensated voltage signal is less than the voltage signal threshold;
  a second summer circuit coupled to an output of the first summer circuit and an output of the selector to generate the second voltage,
  wherein the second summer circuit generates the second voltage according to the compensated voltage signal if the compensated voltage signal is greater than or equal to the voltage signal threshold while the high-side switch is on, and
  wherein the second summer circuit generates the second voltage based on the voltage signal threshold if the compensated voltage signal is less than the voltage signal threshold while the high-side switch is on.

5. The control circuit according to claim 4, wherein the signal conditioning circuit further comprises:
  an energy buffer configured to generate the third voltage according to the compensated voltage signal and store energy according to the third voltage while the high-side switch is on.

6. The control circuit according to claim 5, wherein the energy buffer is configured, after the high-side switch turns off and the low-side switch is on, to output the third voltage to the second comparison circuit according to the energy stored during the high-side switch being on.

7. The control circuit according to claim 1, wherein the signal conditioning circuit comprises:
  a first slope compensation circuit for generating a first compensated voltage signal according to the first voltage as the compensated voltage signal;
  a selector for selectively outputting a voltage based on the voltage signal threshold according to whether the first compensated voltage signal is less than the voltage signal threshold; and
  a first output terminal coupled to an output of the first slope compensation circuit and an output of the selector to output the second voltage,
  wherein the signal conditioning circuit outputs the second voltage according to the first compensated voltage signal through the first output terminal if the first compensated voltage signal is greater than or equal to the voltage signal threshold while the high-side switch is on, and
  wherein the signal conditioning circuit outputs the voltage based on the voltage signal threshold as the second voltage through the first output terminal if the first compensated voltage signal is less than the voltage signal threshold while the high-side switch is on.

8. The control circuit according to claim 7, wherein the signal conditioning circuit further comprises:
  a second slope compensation circuit for generating a second compensated voltage signal according to the first voltage;
  an output switch;
  an energy buffer coupled to the output switch;
  a second output terminal, wherein the output switch coupled between the second output terminal and the second slope compensation circuit, the energy buffer coupled to the second output terminal,
  wherein while the high-side switch is on, the output switch turns on so that the signal conditioning circuit outputs the second compensated voltage signal as the third voltage through the second output terminal and the energy buffer stores energy according to the third voltage.

9. The control circuit according to claim 8, wherein after the high-side switch turns off and the low-side switch is on, the output switch turns off so that the energy buffer output the third voltage to the second comparison circuit according to the energy stored during the high-side switch being on.

10. The control circuit according to claim 1, further comprising:
  a summer circuit, coupled between the second sensor and the second comparison circuit, for outputting a summation signal based on the second sensing signal and a threshold voltage signal,
  wherein the second comparison circuit has a first input terminal to receive the summation signal and a second input terminal to receive the third voltage so as to make the comparison based on the second sensing signal and the third voltage for generating the second comparison signal.

11. The control circuit according to claim 1, wherein the first sensor comprises a high-side current sensor.

12. The control circuit according to claim 1, wherein the second sensor comprises a low-side current sensor.

13. The control circuit according to claim 1, the driver circuit further comprises:
  a control logic circuit for turning on and off the high-side switch and the low-side switch according to the first comparison signal and the second comparison signal.

* * * * *